Harry Jackson INVENTOR
BY Victor J. Evans and Co.
ATTORNEYS

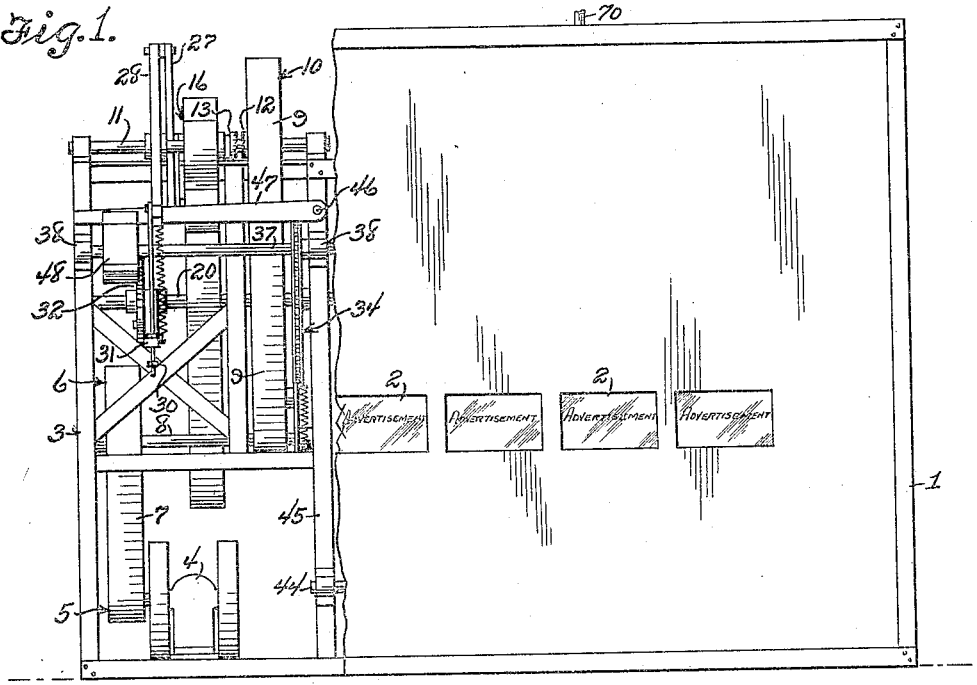
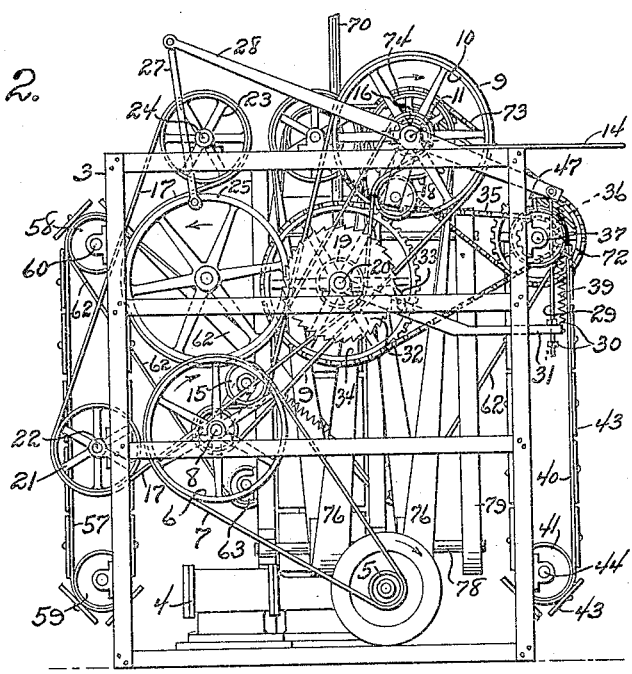

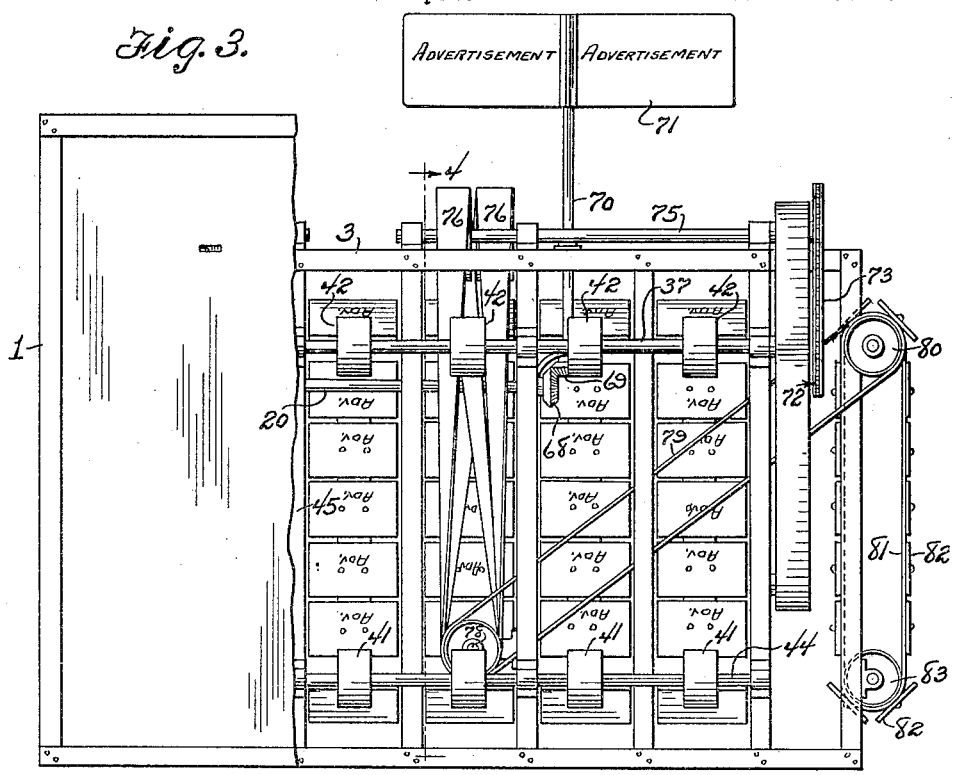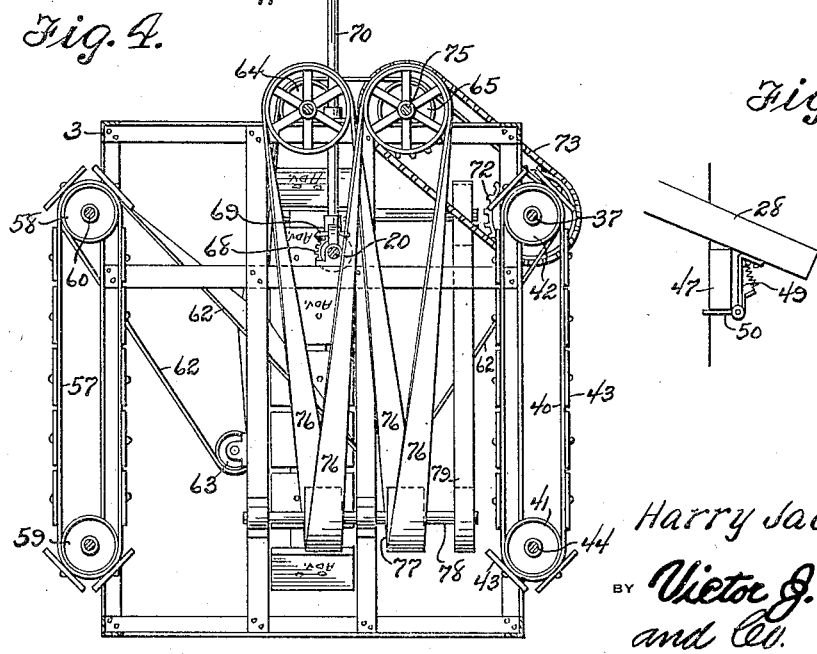

Patented June 28, 1932

1,865,374

UNITED STATES PATENT OFFICE

HARRY JACKSON, OF HARRISBURG, PENNSYLVANIA, ASSIGNOR TO MARY JACKSON, OF HARRISBURG, PENNSYLVANIA

ADVERTISING APPARATUS

Application filed April 15, 1931. Serial No. 530,346.

My present invention has reference to an advertising apparatus.

The primary object of the invention is the provision of a motor driven apparatus in which plates bearing advertising matters are automatically moved in the same direction to display position, halted temporarily in such position so that the advertisements thereon will be fully displayed, arranged in longitudinal alinement in display position, and wherein the device is continuously operated as long as the motor is in operation, and further wherein the apparatus may be halted even when the motor is running.

A further object is the provision of an advertising device or apparatus in which vertically movable advertisement bearing plates are arranged in longitudinal alinement for display through windows of the front and sides of the device and in which plates or vanes also bearing advertising data are arranged for rotary movement at the top of the device, together with motor driven means for imparting motion to all of the advertising bearing members at determined spaced intervals of time, and whereby the pause between the movements of the said members is amply sufficient to permit of the reading of the advertising matters inscribed thereon.

A still further object is the provision of an advertising device which may be readily positioned upon a truck body so that the same can be conveyed from place to place for displaying the advertisements thereon.

A still further object is the provision of an advertising device or apparatus which is characterized by simplicity in construction and reliability and efficiency in practical use.

To the attainment of the foregoing the invention consists in the improvement as hereinafter described and definitely claimed.

In the drawings:

Figure 1 is a side elevation of my improved advertising device, with a portion of the outer casing removed.

Figure 2 is a front elevation thereof, the casing being also removed.

Figure 3 is a view similar to Figure 1 with the right hand portion of the casing removed.

Figure 4 is a sectional view approximately on the line 4—4 of Figure 3.

Figure 7 is a detail elevation to illustrate the latching engagement between the walking beam and the cleat.

Figure 5:
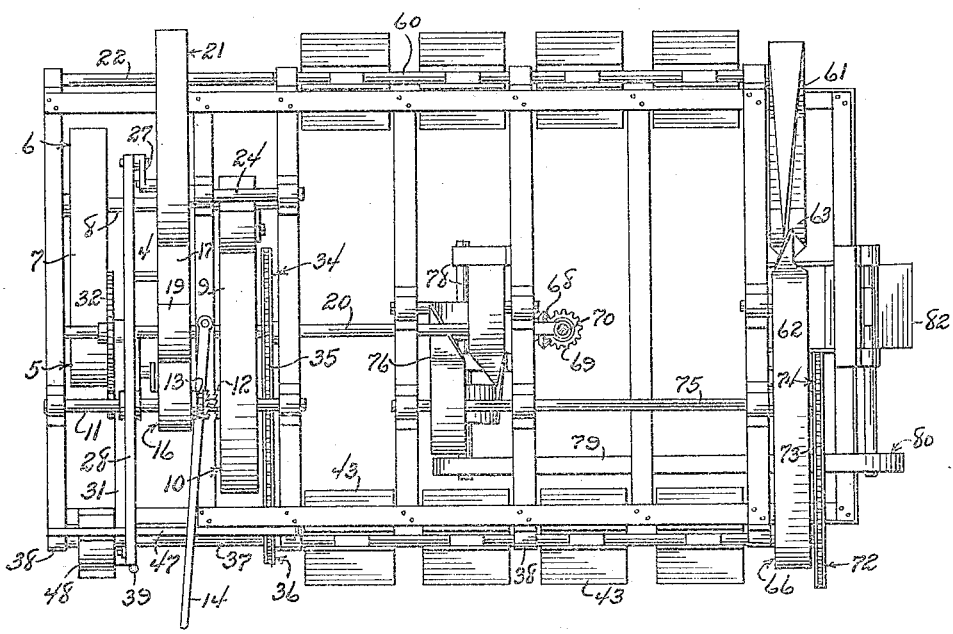
Figure 5 is a top plan view with the vertical shaft in section, and the casing removed.
Figure 6:
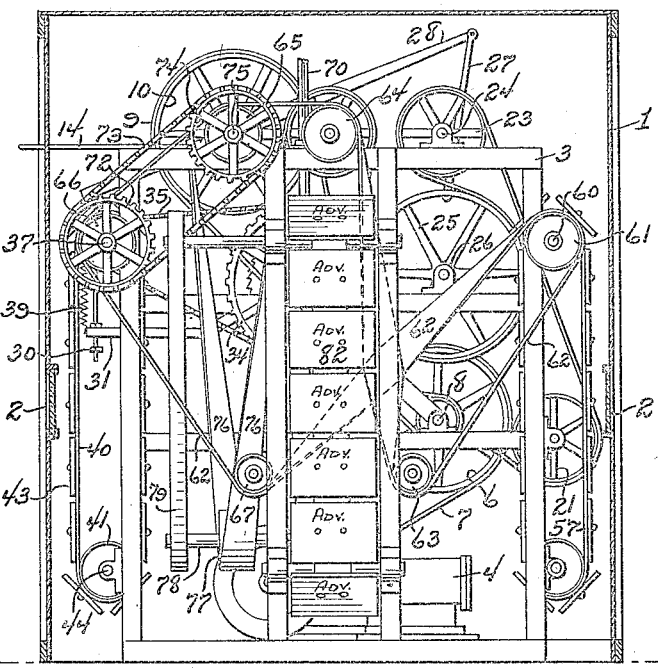
Figure 6 is a rear elevation.

Except for the rotary advertising bearing plates or vanes the mechanism of my improvement is encased in a substantially rectangular housing 1. The housing at its sides and one of its faces is provided with windows 2 which are arranged in longitudinal alinement and are slightly spaced from each other.

In the housing or casing 1 there is a substantially rectangular frame, broadly indicated by the numeral 3. On the bottom and adjacent to one side of the frame there is supported a motor 4. The motor may be electrically operated, but in the showing of the drawings the same is represented by a small type of gasoline driven engine. On the shaft for the fly wheel of the motor 4 there is fixed a pulley 5, and above the pulley there is a belt wheel 6, and an endless belt 7 is trained over the pulley 5 and the wheel 6. The shaft for the wheel 6 is indicated by the numeral 8 and is journaled in suitable bearings provided therefor on the frame 3.

The shaft 8 has fixed thereon a pulley wheel for an endless belt 9. The belt is upwardly directed and is trained over a belt wheel 10 that is loosely or freely journaled on a shaft 11. The hub for the belt wheel 10 has one of its sides provided with a clutch face 12 designed to be engaged by a slidable clutch element 13 that is splined for movement on the shaft 11 and which element 13 is operated by a lever 14 that is pivotally supported on the frame 3. The belt 9 is rotated in taut condition through the medium of a spring influenced belt tightener 15.

On the shaft 11, opposite the slidable clutch 13, there is a fixed pulley 16 for an endless belt 17. The belt is held taut by a spring influenced roller in the nature of a belt tightener 18, and one of the leads of the belt 17 is directed under and is designed to impart motion to a pulley 19 fixed on a shaft 20. This lead of the belt 17 is also directed under a wheel 21 that has its shaft journaled in a bearing 22 on one side of the frame 3, the belt 17 being from thence directed upwardly and over a wheel 23 whose shaft 24 is journaled in suitable bearings on the top of the frame 8. From thence the belt is directed under a wheel 25 whose shaft is also journaled in suitable bearings 26, and the said belt is from thence returned to the pulley 16. By thus training the belt around the various pulleys the wheel 25 will be caused to turn in the direction of the arrows in Figure 2 and in a reverse direction to the turning of the pulley 5 on the engine 4, and the purpose of this arrangement will be presently apparent.

The wheel 25 has eccentrically pivoted thereto a pitman 27 that is upwardly directed and has its outer end pivoted to a walking beam 28. The walking beam finds a bearing on the shaft 11, and to the outer end of the walking beam there is pivotally secured a depending rod 29 which is threaded and which has screwed thereon spaced nuts 30, respectively. The rod 29 passes through one end of a lever 31 which is arranged between the nuts 30, and the said lever has an offset end which is journaled on the shaft 20. Fixed on the shaft 20 there is a ratchet wheel 32 whose teeth are designed to be engaged by a pivotally supported spring influenced dog 33 carried by the lever 31.

Also fixed on the shaft 20 there is a sprocket wheel 34 around which is trained a sprocket chain 35 that is directed around a smaller sprocket wheel 36 whose shaft 37 is journaled through suitable bearings 38 on the side of the frame opposite that provided with the belt guide wheel 21, and the said sprocket wheel 36 is disposed below the rod carrying end of the walking beam 28.

The upper end of the walking beam and that of the lever 31 are influenced toward each other by a coiled spring 39.

The sign carrying plates at the sides and at one of the faces of the apparatus are removably secured on endless belts and the belt carrying sign plates at the side of the device on which the shaft 37 is journaled is indicated by the numeral 40 and travels over lower rolls 41 whose shafts are suitably journaled in bearings on the side of the frame 1 and upper rolls 42 which are fixed on the shaft 37. The sign plates are for distinction indicated by the numerals 43. The sign plates and the rollers therefor are disposed to one side of the mechanism above described, and therefore, the shaft for the lower rolls 41, indicated for distinction by the numeral 44 is of a less length than the shaft 37 and the bearing for one end of the shaft 44 is attached to an upright 45 that is also provided with a bearing for the shaft 37. There is pivoted, as at 46, to the upright 45 an arm or cleat 47 that is directed toward the end of the frame 3 and the shaft 37 has fixed thereon a cam or lug carrying wheel 48 on which the arm or cleat 47 rests. The engagement of the cleat 47 with the cam wheel holds the shaft 37 from turning during the descent of lever 31. The outer end of the walking beam 28 has fixed on its under face a depending bracket 49 (Figure 7) to which is pivoted a spring influenced latch finger 50, and this finger is designed to spring beneath the arm 47 and thereafter lift the same from engagement with the cam wheel 48 to permit turning of the ratchet wheel 32 when the walking beam has its second end moved downwardly by the rotation of the wheel 25. This swinging of the walking beam raises the lever 31 to cause the dog 33 to turn the ratchet wheel 32 and as a result to turn the sprocket wheels 34 and 36 to properly aline one longitudinal series of advertising plates 40 with respect to the windows 2 in the casing 1. The upward swinging of the latch carrying end of the walking beam may permit of the said latch riding off of the cleat 47, or the upward swinging of the cleat may be regulated by any suitable stop means, such as by the contact of the said cleat with the under face of the lever 14, which will permit the release of the pivoted spring influenced latch and the downward swinging of the cleat to bring the same into engagement with the cam wheel, and whereby the series of advertising plates 40 are successively brought opposite the windows 2.

A timed movement of the plate carrying belt 57 on the second side of the frame is imparted in a manner which will now be described. The belt 57 travels around upper and lower pulleys 58 and 59, respectively, whose shafts are journaled in suitable bearings on the frame. The shaft for the upper series of pulleys 58 is indicated for distinction by the numeral 60. This shaft has fixed thereon an additional pulley or belt wheel 61 for a belt 62. The lower lead of this belt is trained under a pulley 63 and is from thence given a half twist and trained over a pulley 64 on the top of the frame. From thence the belt is guided over a pulley 65 on the shaft 11, over a pulley 66 on the shaft 37, downward and under a pulley 67, given a half twist and returned to the pulley 61. By this arrangement the plates on the endless belt 57 will be caused to move in an upward direction, that is, of course, the outer or display plates. The belt 64 is tensioned by a spring influenced belt tightener.

The shaft 20 has on its inner end a beveled gear 68 in mesh with a similar gear 69 fixed on the end of an upwardly extending vertically disposed shaft 70. The shaft 70 is journaled in suitable bearings and extends through the top of the casing 1 and has fixed on its outer end angularly arranged plates or vanes 71 upon which are printed advertising matters. The shaft 70 is turned intermittently in timed relation with the movement of the endless plate carrying belts so that the several vanes 71 will intermittently be brought to display position.

Fixed on the shaft 37 there is a sprocket wheel 72 larger than the sprocket wheel 36 and which has trained thereover a sprocket chain 73 that is also trained over a sprocket wheel 74 on the shaft 75 that is in longitudinal alinement with the shaft 11. The shaft 75 has fixed thereon a pulley wheel for a twisted belt 76. The belt is downwardly directed and is trained around a pulley wheel 77 suitably journaled adjacent to the lower portion of the frame. The belt is from thence trained upwardly over another pulley wheel and downwardly over a pulley wheel fixed on the shaft 78 on which the pulley wheel 77 is fixed. These twisted belts operate a straight belt 79 trained over the upper roll 80 for the endless belt 81 that carries the rear sign plates 82, the said belt 81 being also trained under a lower roll 83, the rolls 80 and 83 having their shafts journaled in suitable bearings.

The arrangement of the mechanisms above described, which, of course, includes the twisted belts, imparts a slow movement to all of the signs, causes the sign plates upon the opposite sides and rear of the device to move upwardly in timed relation with each other, such movement, however, being simultaneous so that the several series of plates will be brought successively to view through the several windows and will be halted for a predetermined interval of time when arranged opposite the window. Each of the belt shafts may be provided with any desired number of wheels or rolls so that a plurality of advertising sign carrying belts may be trained therearound, while the slowly and intermittently halted vanes will bring to display other advertising matters. The device as a whole presents a unique advertising apparatus and which cannot fail but to attract attention. As the device is primarily designed to be arranged upon a truck body I have referred to the end thereof not provided with the movable advertising plates as the front of the improvement, and this front is preferably open and closed by the door so that access to the mechanism in the casing may be readily obtained and the engine as well as the clutch lever 14 operated or brought to inoperative position.

While I have illustrated a satisfactory embodiment of my improved device my features of invention are capable of extended application and I do not wish to be restricted to the specific structure herein shown and described.

Having described the invention, I claim:

1. An advertising device including a casing having its sides and end provided with windows, advertisement bearing plates mounted on endless belts arranged to the rear, means for imparting simultaneous movement to all of the belts to cause the same to travel in the same direction to bring the series of plates thereon opposite the windows and means for temporarily halting the movement of the belts when the plates are in display position, a vertically disposed shaft having vanes bearing advertising matter, and means for turning the shaft in timed relation to the movement of the belts.

2. An advertising device including a casing provided with windows, endless belts to the rear of the windows, removable advertising plates arranged in series on the belts, an operating motor, twisted belts operated by the motor and operating the endless belts to cause all of the endless belts to travel in the same direction and at a low ratio of speed, and means actuated by the twisted belts for stopping the movement of the endless belts for a predetermined period of time when the plates thereon are arranged opposite the windows.

3. An advertising device including a casing provided with windows, endless belts to the rear of the windows, removable advertising plates arranged in series on the belts, an operating motor, straight and twisted belts operated by the motor for operating the endless belts to cause all of the endless belts to travel in the same direction at a low ratio of speed, and means actuated by the straight and twisted belts for stopping the movement of the endless belts for a predetermined period of time when the plates thereon are arranged opposite the windows, and clutch operated means for relieving the belts from influence by the motor.

4. An advertising device including a casing provided with windows, endless belts carrying advertising data arranged to the rear of the windows, an operating motor, straight and twisted belts trained over pulleys to lengthen said belts to reduce the speed of travel thereof and said belts being connected with the advertising belts to impart a slow and simultaneous movement thereto in the same direction, and means actuated by the motor for imparting movement to one of the second named belts, and means operated by the turning of the motor for simultaneously and temporarily halting the movement of the belts when the advertising data has been brought opposite the windows.

5. In an advertising device, a casing having windows, endless belts carrying advertising plates disposed to the rear of the windows, an operating motor, a pivoted walking beam, a wheel having an eccentric pitman connected to the walking beam, a cam wheel on one of the endless belts, a swingable stop arm to engage with the cam wheel, a spring influenced catch on the walking beam to engage with the arm, a ratchet wheel, a pivotally supported lever having a dog to engage with the ratchet wheel, a rod depending from the walking beam and passing through the lever, adjustable stop means on the rod between which the lever is received, a spring for influencing the walking beam and lever, means actuated by the turning of the ratchet wheel for imparting a timed movement to the endless belt, and means actuated by the movement of said belt for imparting a simultaneous movement in the same direction to the remaining belts, and said motion imparting means being actuated by the motor.

In testimony whereof I affix my signature.

HARRY JACKSON.